INVENTOR
THOMAS DURSO

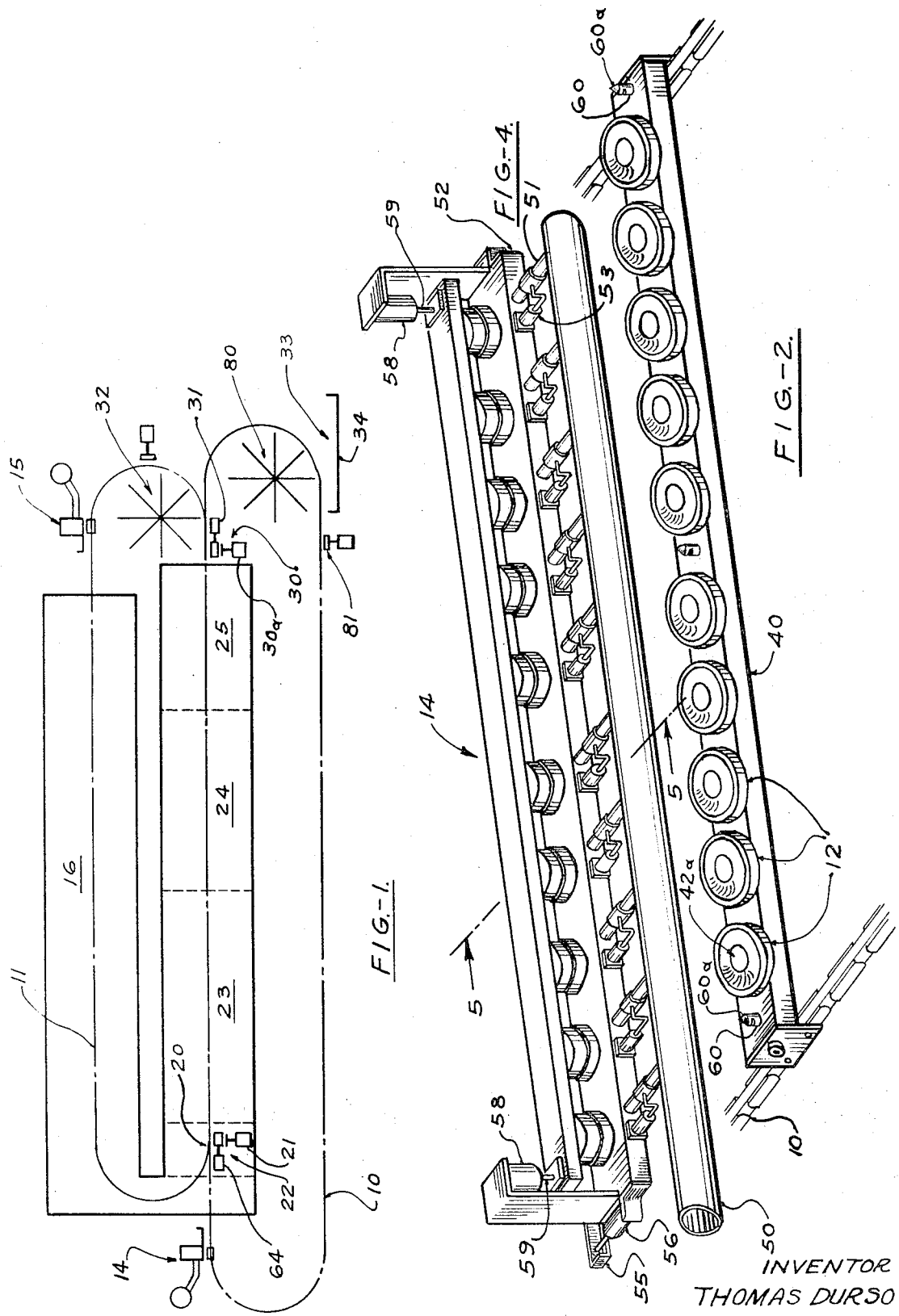

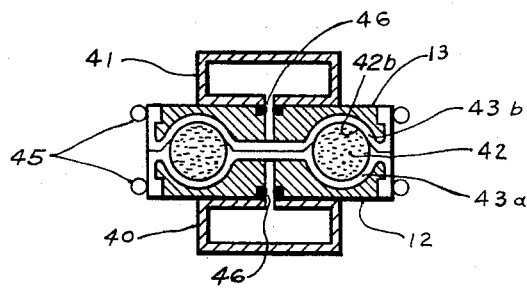
FIG.-3.
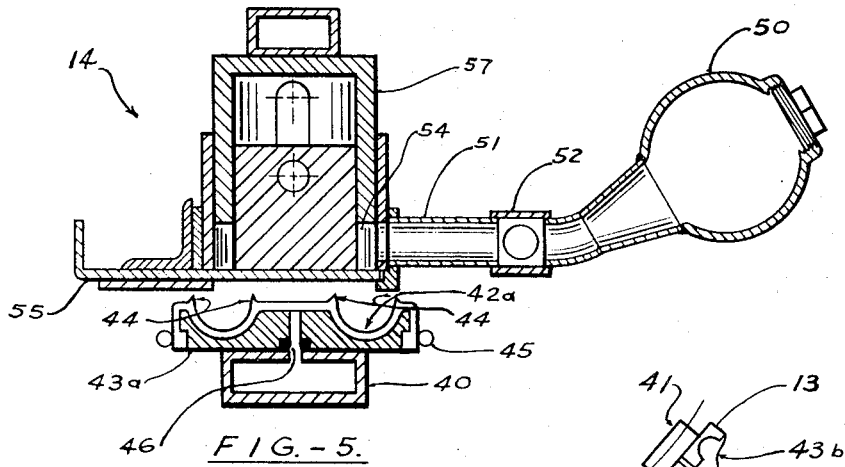
FIG.-5.
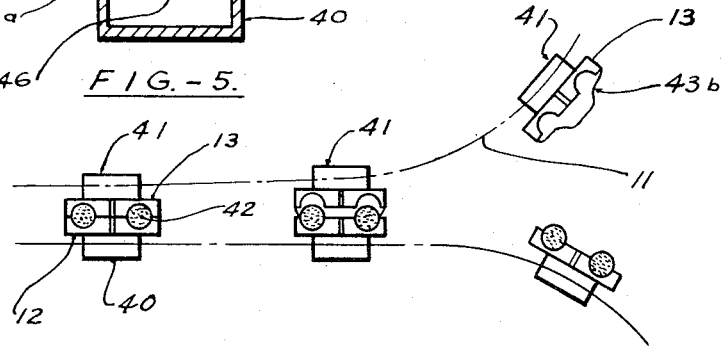
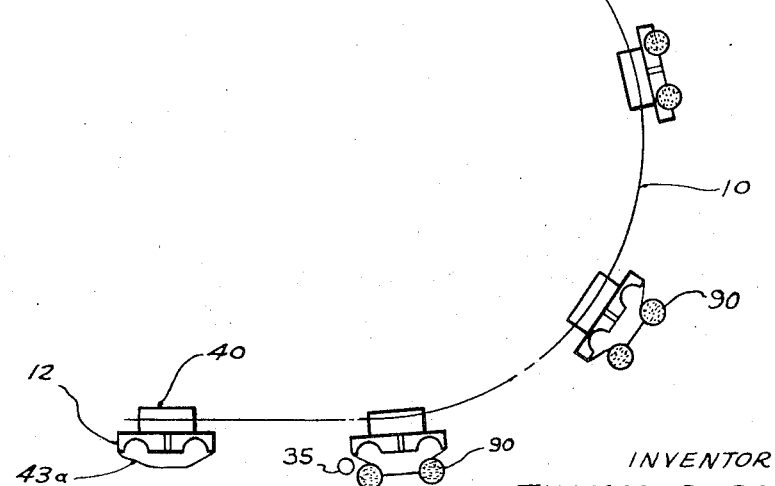
FIG.-6.
INVENTOR
THOMAS DURSO Dec. 25, 1973  T. DURSO  3,781,447
METHOD AND APPARATUS FOR PRODUCING AN
ANNULAR SKINLESS SAUSAGE PRODUCT
Filed Feb. 12, 1971  3 Sheets-Sheet 3

United States Patent Office 3,781,447
Patented Dec. 25, 1973

3,781,447
METHOD AND APPARATUS FOR PRODUCING AN ANNULAR SKINLESS SAUSAGE PRODUCT
Thomas Durso, 8111 Gross Point Road,
Morton Grove, Ill. 60053
Continuation-in-part of abandoned application Ser. No. 791,368, Jan. 15, 1969. This application Feb. 12, 1971, Ser. No. 114,956
Int. Cl. A22c 11/00
U.S. Cl. 426—513
9 Claims

ABSTRACT OF THE DISCLOSURE

A method and apparatus for the manufacture of annular skinless sausage products by placing sausage batter into a pair of cooperating molds, locking the molds together, cooking the batter, and removing the annular sausage product from the molds. In the illustrated embodiment, air pressure is used to free the sausage from the mold.

CROSS REFERENCE TO RELATED APPLICATION

This application is a continuation-in-part of my application Ser. No. 791,368, filed Jan. 15, 1969, now abandoned.

DESCRIPTION OF THE INVENTION

The present invention relates generally to annular meat products and, more particularly, to a method and apparatus for making annular skinless sausages.

It is a primary object of the present invention to provide a method and apparatus for making annular sausage products in mass production operations. Another object of the invention is to produce an annular sausage product which is similar in taste, texture, etc. to that of conventional wieners.

Another object of the invention is to provide a method and apparatus for making annular sausage products in a single continuous operation which is highly efficient.

Yet another object of the invention is to provide a method and apparatus for making an annular sausage product which is highly automated.

Other objects and advantages of the invention will become apparent by reference to the following detailed description, and the accompanying drawings in which:

FIG. 1 is a schematic diagram of a manufacturing operation embodying the method of the present invention;

FIG. 2 is a perspective view of one section of a conveyor equipped with a series of sausage molds as utilized in an exemplary embodiment of the invention as shown in FIG. 1;

FIG. 3 is a sectional view taken along the center of a pair of molds, the molds being arranged on a pair of transverse bars located on the conveyor lines as depicted in FIG. 2;

FIG. 4 is a perspective view of a mold filling device for use in conjunction with the mold bar as shown in FIG. 2 in accordance with the method as illustrated in FIG. 1;

FIG. 5 is a section taken along line 5–5 in FIG. 4 with the lower section of a sausage mold positioned under the filling device for receiving sausage batter;

FIG. 6 is an enlarged stop motion, sectional view of fragments of the mold conveyors in their various positions during the sausage making process which is depicted in FIG. 1;

Figure 7:
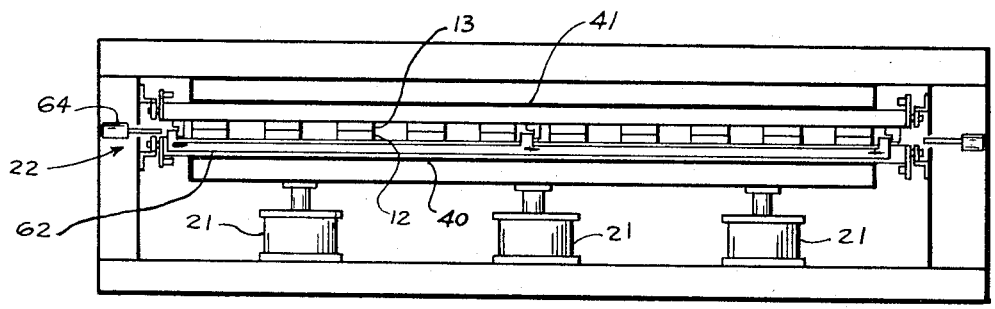
FIG. 7 is a side elevation of a mold locking arrangement for use in the method illustrated in FIG. 1.

While the invention will be described in connection with certain preferred embodiments, it will be understood that it is not intended to limit the invention to any particular illustrative embodiment. On the contrary, it is intended to cover all alternatives, modifications and equivalent arrangements as may be included within the spirit and scope of the invention.

Turning now to FIG. 1, there is illustrated one embodiment of the invention which will produce a satisfactory skinless, annular sausage product. The sausage is manufactured on a pair of endless chain conveyors 10 and 11, with conveyor 11 being located directly above conveyor 10. Mounted on the conveyors 10 and 11 are a plurality of sets of annular mold sections 12 and 13 arranged in successive series extending transversely of the conveyors, with the lower mold sections 12 located on the conveyor 10 and the upper sections 13 located on the conveyor 11. These mold sections 12 and 13 are respectively supplied with a meat emulsion or sausage batter by a pair of identical supply systems 14 and 15.

In accordance with one important aspect of the present invention, the meat emulsion in the upper mold sections 13 is cooled to chill the emulsion at the surface of the mold and thereby cause the emulsion to adhere to the walls of the mold cavity; and then the upper mold sections are inverted and positioned over the lower mold sections 12 in register therewith. Because of the initial cooling step, the emulsion remains in place in the upper mold sections while they are inverted and brought into register with the lower mold sections. Thus, in the illustrative embodiment, the upper mold sections 13 are filled with meat emulsion by the supply system 15, and are then moved along the conveyor 10 to a refrigeration zone 16. In the refrigeration zone, the emulsion adjacent the mold surface is chilled in a controlled air temperature at least as low as about 32° F. to cause the fats in the emulsion at the mold surfaces to solidify and adhere to the mold sections 13 when those mold sections are subsequently inverted. The lower mold sections 12 are filled in a like manner by the supply system 14. As the upper mold sections 13 emerge from the refrigerated zone 16, they are inverted and transported to a position opposite the lower mold sections 12 at a locking station 20.

In accordance with another important aspect of the invention, the meat emulsion in the annular mold cavities is compressed and then heated, while in the compressed condition, to cook the emulsion and thereby form annular skinless sausage products. After cooking, the sausage products are cooled in the molds and then removed from the molds. Thus, in the illustrative arrangement, the mold sections 12 and 13 are registered and pressed together at the locking station 20 by pressure cylinders 21, and then locked by a solenoid actuated locking device 22. The locked mold sections are then moved along the respective conveyors 10, 11 to a cooking zone 23 where the meat emulsion is heated in a controlled air temperature in the range of from about 190° F. to about 210° F. to form cooked annular skinless sausage products. After the cooking step, the molds are advanced to a second cooling zone 24 where the emulsion is cooled at a temperature at least as low as about 34° F. to prevent spoilage of the meat. The molds are then moved to another heating zone 25 where the molds are re-heated just enough to soften only the outermost surface of the sausages; to facilitate removal of the sausage products from the molds. For example, heating the molds to a temperature of about 150° F. is usually sufficient to release the sausage products from the surfaces of the mold cavities. While this heating of the exterior of the sausages aids in removing the sausages from the molds, it does not affect the overall lower temperature of the interior portion of the meat product, and consequently the final products are still in condition for low temperature storage.

The molds are then moved along the conveyors to an unlocking station 30, where the mold sections are unlocked by a solenoid 31, as will be described in more detail below. The unlocked mold sections are then advanced along their respective conveyors, conveyor 11 causing the upper mold sections 13 to move upwardly away from the lower mold sections 12 while conveyor 10 moves the lower mold section 12 downwardly away from the upper mold sections 13. At this point the sausages are released from the upper sections 13 by fluid pressure means 32 (FIGS. 10-12) in a manner to be described later in greater detail. The lower mold sections 12 are then moved further along the conveyor 10 to a removal station 33 where the sausages are removed from the lower mold sections by another fluid pressure means 80. The sausages are then allowed to fall by force of gravity into a collecting tray 34, and the production cycle is repeated.

It will be understood that the conveyors 10 and 11 are driven in synchronization with each other by any conventional drive means known to the art; for example, a hydraulic system may be employed with a drive cylinder for the upper conveyor, and a drive cylinder for the lower conveyor, with the upper conveyor having fluid piping connections to the lower cylinder so as to cause the two conveyors to operate in synchronization. It will also be understood that all solenoids utilized in the illustrative method are actuated automatically in synchronization with the conveyor lines, as by limit switches for example, and are controlled by conventional means known to the art.

Figures 10, 11:
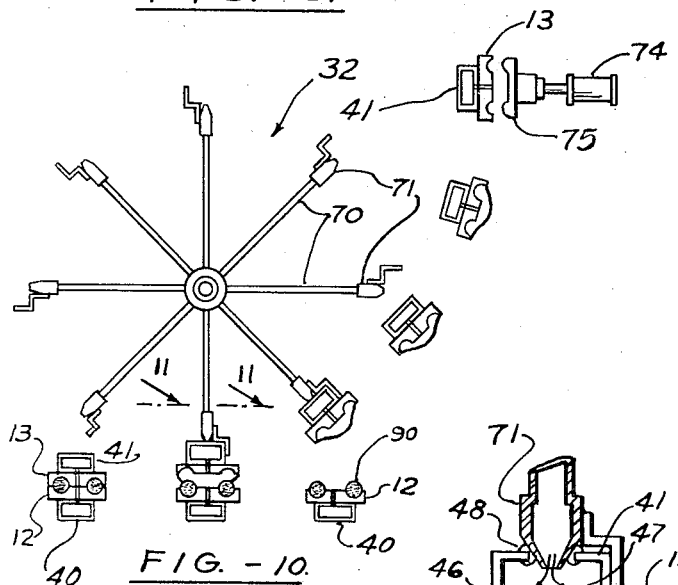
FIG. 10 is a side elevation of the air supply means used for freeing the sausages from the sausage molds in accordance with the method illustrated in FIG. 1.
FIG. 11 is an enlarged sectional view taken along 11—11 in FIG. 10.
Figure 12:
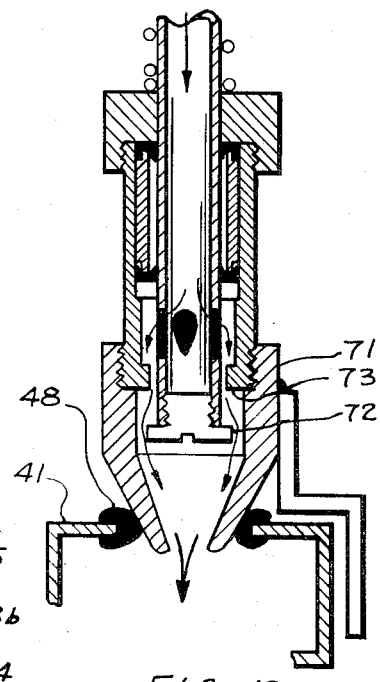
FIG. 12 is an enlarged sectional view of that portion of the fluid pressure supply means which is connected to a mold bar.

Turning now to a more detailed description of the illustrated embodiment, a multiplicity of sauages are made simultaneously in successive groups of ten circular sections 12 and 13 arranged in successive transverse series on corresponding transverse mold bars 40 and 41 mounted on the lower and upper conveyors 10 and 11, respectively. Referring more particularly to FIG. 3, each of the mold sections 12, 13 is constructed so as to provide an annular mold cavity 42, one half 42a of said cavity being formed by mold section 12, the other half 42b being formed by mold section 13. The molding surfaces of the respective sections 12 and 13 are covered with suitable smooth linings 43a and 43b, made of "Teflon" for example, which resist adhesion of the sausage to its surface. To facilitate the seating of the two molds together, the linings 43a in the lower mold sections 12 are provided with lips 44 (FIGS. 5 and 11) around both the inner and outer peripheries of the lower mold cavity for meshing with the peripheral portions of the upper mold cavity. For the purpose of removing the sausage products from the mold, as will be described in more detail below, the linings 43a and 43b of the respective molds are secured to the mold sections only around the peripheries thereof by means of springs 45. To facilitate removal of the sausages from the molds, as will also be described in more detail below, each mold is further provided with air passages 46 which register with similar openings 47 (FIG. 11) in the inboard walls of the hollow mold bars 40 and 41. As illustrated in FIGS. 11 and 12, each mold bar 40 and 41 is provided with a single fluid port, having a sealing gasket 48 around the periphery thereof, in the outboard wall of the bar.

As each mold bar 40 or 41 arrives at its respective filling station 14 or 15, the meat emulsion is supplied under pressure, normally 20 to 30 pounds per square inch, from an emulsion supply tube 50 (FIGS. 4 and 5) into a plurality of mold supply lines 51. From the supply lines 51, the emulsion is fed under pressure via ball valves 52, controlled by solenoids 53, into an annular chamber 54 aligned with the annular mold cavity. After the chamber 54 is filled, the valve 52 is closed, and the bottom of the chamber is opened by retracting a plate 55 by solenoid 56 (FIG. 4) so as to allow the emulsion to pass from the chamber 54 into the mold cavity aligned therewith. For this purpose, a series of annular pistons 57, driven by a pair of hydraulic cylinders 58 (FIG. 4) via connecting rods 59, charge the emulsion from the chamber 54 down into the mold cavities. After the charging stroke of the piston 57, it is immediately retracted and the bottom of the chamber 54 is reclosed by returning the plate 55 to its original position, thus readying the emulsion supply system for another cycle. It will be understood that the conveyors 10, 11 are driven intermittently so that each mold bar 40 dwells for a short predetermined interval at the filling station. Synchronization of the dwell interval with the filling operation may be achieved by providing limit switches to detect the arrival of each mold bar at the filling station and to initiate a filling cycle in response to each such arrival.

From the filling station 15, the mold sections 13 on the upper conveyor 11 are advanced into the refrigerated zone 16 in a temperature controlled tunnel. This controlled refrigerated zone may be maintained at the desired temperature of 32° F. or less by conventional and well-known refrigeration equipment which need not be described herein. As mentioned previously, the purpose of this preliminary cooling step is to cool that portion of the meat emulsion which contacts the surfaces of the mold cavities so as to cause the emulsion to adhere to the mold cavities during the subsequent inversion step.

Figures 8, 9:
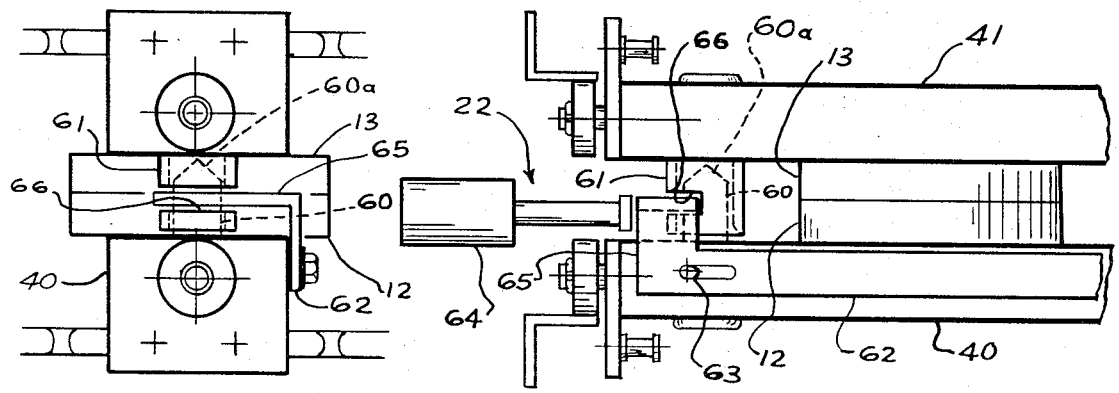
FIG. 8 is an enlarged side elevation of a fragment of the mold locking arrangement illustrated in FIG. 7.
FIG. 9 is an enlarged end elevation of the mold locking arrangement illustrated in FIG. 7.

As the mold sections 13 emerge from the refrigerated zone 16, they are inverted by the conveyor 11 and advanced to the mold locking station 20 where the mold sections 13 are positioned opposite the filled lower mold sections 12 located on the lower conveyor 10. As shown most clearly in FIGS. 7-9, the upper and lower mold bars 40 and 41 are forced together at the locking station 20 by hydraulic cylinders 21, thus compressing the emulsion located within the molds to a pressure of at least about 300 p.s.i. To insure that the upper and lower molds register properly, a pair of seating pins 60 are provided on opposite ends of the lower mold bar 40, and a corresponding pair of seating chambers 61 are provided on the upper mold bar 41. The seating pins 60 have conical tip portions 60a to provide ease of entry into the chambers 61 as the mold bars 40 and 41 are pressed together. The pins and chambers are rigidly mounted on the bars 40 and 41 are so positioned that when the nonconical portion of the pin is inside the chamber, the molds which are rigidly mounted on the bars 40 and 41 are properly seated.

To lock the mold sections together after the opposed mold sections are properly seated, there is provided a locking bar 62 (FIGS. 7-9) which is slidably mounted on pins 63. While the mold sections 12, 13 are still pressed together by the cylinders 21, a solenoid 64 pushes the bar 62 horizontally to the right as viewed in FIGS. 7 and 8, thereby causing an upwardly extending lug 65 on the bar 62 to fit into a corresponding slot 66 formed by the mold seating pin 60 and the mold seating chamber 61. It will be understood that a similar locking arrangement is provided at both ends of each pair of mold bars, so that the mold stations are securely locked together along the entire length of each transverse series.

The pair of mold bars thus locked together are next moved to the cooking zone 23, where the batter is heated to a temperature sufficient to cook the same, e.g., 160° F. to 180° F. After cooking has been accomplished, the molds are advanced into the cooling zone 24 where the cooked sausage products are cooled throughout their entire thickness to a temperature at least as low as 34° F. to reduce the temperature of the sausages for packaging and handling and to preserve the sausages in storage. From the cooling zone 24, the cooled molds are passed through the final heating zone 25 where the molds are heated slightly to facilitate removal of the sausage from the molds. More particularly, only the outer surfaces of the sausage products are heated so as to soften the same to facilitate the release thereof from the mold walls. The main bulk of the sausages remain at the cooled storage temperature.

At the end of the heating zone 25, the molds emerge from the temperature-controlled tunnel and advance to an unlocking station 30. At the unlocking station hydraulic cylinders 30a again press the two mold sections 12 and 13 together, in the same manner as the cylinders 21 at the locking station, while the solenoid 31 is actuated to move the locking bar 62 to the left as viewed in FIGS. 7 and 8. This movement of the bar 62 retracts the lugs 65 of bar 62 out of the slot 66 formed by the mold seating pin 60 and mold seating pin chamber 61, thereby unlocking the upper and lower mold sections to allow them to be separated.

In accordance with one aspect of this invention, the sausage products are removed from the mold sections by deflecting the resilient liners away from the surfaces of the mold cavities. Thus, as the conveyors 10 and 11 diverge beyond the unlocking station 30, the molds 12 and 13 are separated, and the sausage 90 is removed from the upper mold first. To this end, there is provided a fluid pressure source 32 provided with several supply arms 70 (FIG. 10) which terminate in seating tips or nozzles 71 adapted to fit into ports formed in the upper mold bars 41 and lined with gaskets 48. To cause the air supply means to be positioned in the gasket 48, the tips 71 of the arms 70 are spring mounted on the arms 70. The supply arm 70 are rotated counterclockwise as viewed in FIG. 10, causing the arms 70 and the tips 71 to pass across the mold bars 41. The length of the arm 70 including the tip 71 is such that as the arm is rotated, the tip is cammed upwardly against the spring tension as the tip 71 is forced against the bar 41. When the tip 71 is opposite the gasket 48, the arm ceases rotation and the spring bias on the tip 71 forces the tip downward into the port in the mold bar, insuring a good seal around the periphery of the gasket 48. As illustrated in FIG. 12, when the tip 71 of the fluid pressure supply arm 70 is seated in the gasket 48, the tip 71 is not allowed to reach its downmost position. In this position a valve 72 within the tip 71 is not allowed to rest upon its seat 83, and consequently fluid pressure, e.g., compressed air, is allowed to pass through the arm 70 and into the cavity of bar 41.

Referring now more particularly to FIG. 11, the fluid pressure passes through the cavity of the bar 41 and the openings 47 and 46 of the bar 41 and the mold sections 13, respectively, and applies force against the resilient mold liner 43b. As the resilient material 43b is secured to the mold only along the edges thereof, the center of the liner material on the upper mold section is deflected outward away from the surface of the mold cavity by this fluid pressure, thereby releasing the sausages 90 from the upper molds 13. This process is illustrated in FIG. 6 in stop motion. After the sausage 90 has been removed, the conveyor line 11 causes the mold bar 41 to move upwardly away from the fluid pressure supply arm 70 and the spring mounting means of tip 71 causes the tip to move to its outmost position thus automatically closing valve 72 located within the tip. When the tip is removed, the pressure within the bar 41 is dissipated into the atmosphere.

After release of the sausages, the molds 13 are advanced to a complementally formed resetting member 75 (FIG. 10) which is forced against the molds by a hydraulic cylinder 74, thus resetting the resilient material against the mold surface.

The sausages 90 are now located only in the lower mold sections 12 on the lower conveyor 10. These mold sections 12 are moved by the conveyor 10 to the discharge station 33 (FIG. 1) where another fluid pressure supply means 80, identical to the system 32 described above, cooperates with the lower mold bars 40 in a manner identical to that just described for the upper mold bars 41. The removal of the sausages 90 from the lower molds is accomplished in a manner identical to the removal from the upper molds previously described. The removed sausages are allowed to fall free from the lower mold sections 12 into the collecting tray 34 located directly beneath the fluid pressure supply means 80. To insure that the sausages 90 are released from the lower liners 43a, a roller 35 is positioned to pass between the liner 43a and the sausage product. After the sausages 90 have been removed from the lower mold sections 12, the molds are advanced to a mold resetting member 81 (FIG. 1) where the resilient liners of the mold sections 12 are reset in the same manner as the liners of the upper molds. After the resilient liners of both the upper and lower molds have been reset, the system is ready for another manufacturing cycle.

From the above description, one may see that an annular shaped, skinless sausage may be obtained utilizing ordinary wiener batter. The resulting product comprises a single closed circular annulus of cooked meat emulsion molded to have a substantially circular radial cross section, but otherwise has identical characteristics to that of the conventional skinless weiner. This product is obtained in a manner commercially suited for the efficient mass production necessary to make the product competitive, and without the use of any sausage casings, thereby providing a cost saving.

While the invention has been described utilizing particular molds and processes in a certain order, it may be readily recognized that the design of the molds may be easily varied, and the order of the processes changed, and yet the same meat product obtained.

I claim as my invention:

1. A method of producing an annular skinless sausage product comprising the steps of providing a plurality of molds each of which comprises two mold sections forming respective cavities in the form of a closed annulus and designed to register with each other when the two mold sections are brought together, separately filling the annular cavity in each of said mold sections with a sausage meat emulsion before bringing the two sections of each mold together, bringing the two sections of each mold into register with each other with the annular cavities in the two sections facing each other so as to form a single closed annular mold cavity completely filled with the sausage meat emulsion, compressing the sausage meat emulsion in each of said annular mold cavities after the two sections of each mold have been brought into register with each other, heating the sausage meat emulsion while maintaining the sausage meat emulsion under compression in each of said annular mold cavities to cook the sausage meat emulsion and thereby form skinless sausage products each in the form of a closed annulus, cooling the sausage meat emulsion in said mold cavities, and removing said annular skinless sausage products from the annular mold cavities.

2. A method of producing an annular skinless sausage product as set forth in claim 1 wherein said sausage meat emulsion is heated to a temperature in the range of from about 160° F. to about 180° F. in said heating step.

3. A method of producing an annular skinless sausage product as set forth in claim 1 wherein said sausage meat emulsion is cooled to a temperature at least as low as 34° F. in said cooling step.

4. A method of producing an annular skinless sausage product as set forth in claim 1 including the steps of cooling the sausage meat emulsion in one of said mold sections after the filling thereof to cause the sausage meat emulsion to adhere to the walls of that mold section, inverting the mold section containing the cooled sausage meat emulsion, and positioning the inverted mold section over the other mold section with the annular cavities in said section in register with each other, prior to said compressing step.

5. A method of producing an annular skinless sausage product as set forth in claim 4 wherein said sausage meat emulsion is subjected to a temperature at least as low as about 32° F.

6. Apparatus for producing an annular skinless sausage product comprising the combination of a plurality of molds each of which comprises two mold sections forming respective cavities in the form of a closed annulus and designed to register with each other when the two mold sections are brought together, means for filling the annular cavity in each of said mold sections with a sausage meat emulsion before the two sections of each mold are brought together, means for bringing the two sections of each mold into register with the annular cavities in the two sections facing each other so as to form a single closed annular mold cavity completely filled with the sausage meat emulsion, means for compressing the sausage meat emulsion in each of said annular mold cavities after the two sections of each mold have been brought into register with each other, means for heating the sausage meat emulsion while maintaining the sausage meat emulsion under compression in each of said annular mold cavities to cook the sausage meat emulsion and thereby form skinless sausage products in the form of a closed annulus, means for cooling the sausage meat emulsion in said mold cavities, and means for removing said annular skinless sausage products from the annular mold cavities.

7. Apparatus for producing an annular skinless sausage product as set forth in claim 6 including means for cooling the sausage meat emulsion in one of said mold sections to cause the sausage meat emulsion to adhere to the walls of that mold section, means for inverting the mold section containing the cooled sausage meat emulsion, and means for positioning the inverted mold section over the other mold section with the annular cavities in said section in register with each other.

8. Apparatus for producing an annular skinless sausage product as set forth in claim 6 wherein each of said plurality of molds comprises two mold sections each having a rigid member forming an annular cavity and a resilient liner covering the surface of said annular cavity and secured to said rigid member around the outside periphery of said annular cavity, said rigid member also forming a fluid port inside the inner periphery of said annular cavity whereby pressurized fluid passed through said port deflects said resilient liner outwardly away from said annular cavity.

9. Apparatus for producing an annular skinless sausage product as set forth in claim 8 which includes a source of pressurized fluid, fluid conduit means operatively connected to the fluid ports in said mold sections for receiving pressurized fluid and applying the same to said mold liners to deflect said liners away from the surfaces of said mold cavities, and means operatively connected to said source of pressurized fluid for connecting said source to said fluid conduit means associated with successive transverse series of said molds.

References Cited
UNITED STATES PATENTS

| | | | |
|---|---|---|---|
| 1,663,719 | 3/1928 | Morley | 99—372 X |
| 2,507,486 | 5/1950 | Weissenbach | 99—109 X |
| 3,180,737 | 4/1965 | Culp | 99—109 |
| 3,236,196 | 2/1966 | Ibex | 99—372 X |

HYMAN LORD, Primary Examiner

U.S. Cl. X.R.

99—354; 476—520, 524